APPARATUS FOR PROJECTING MULTIPLE SUPERPOSED IMAGES
Filed April 25, 1966 10 Sheets-Sheet 1
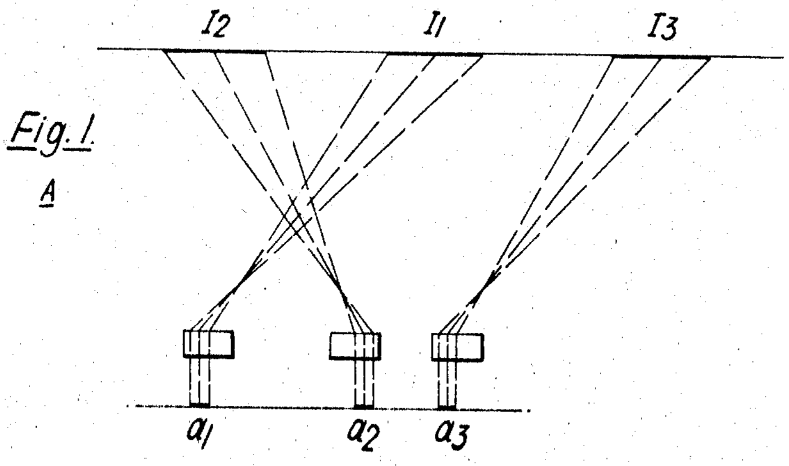
Fig. 1 A
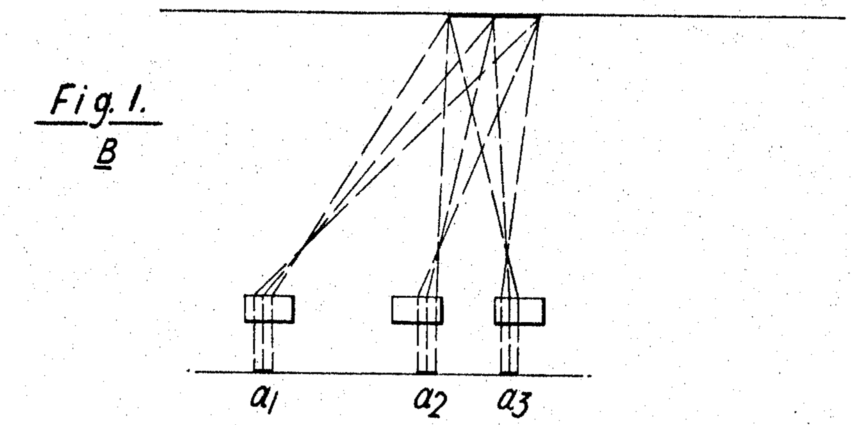
Fig. 1. B
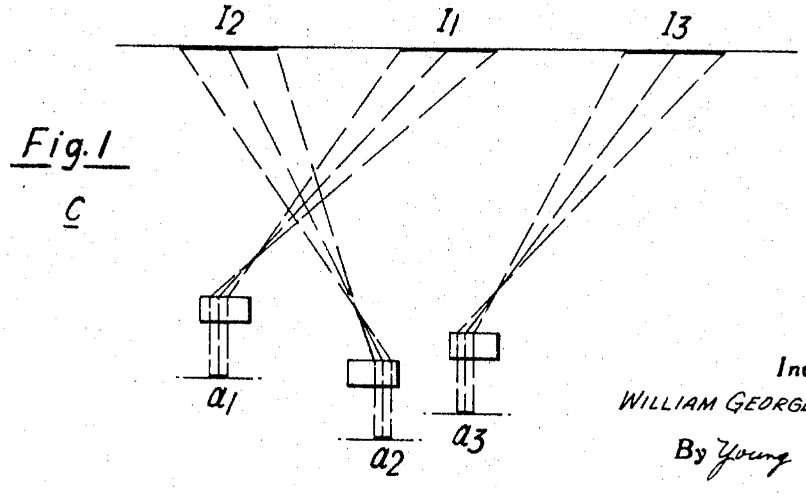
Fig. 1 C
Inventor
WILLIAM GEORGE COLLIS
By Young & Thompson
Attorneys Inventor
WILLIAM GEORGE COLLIS
By Young & Thompson
Attorneys

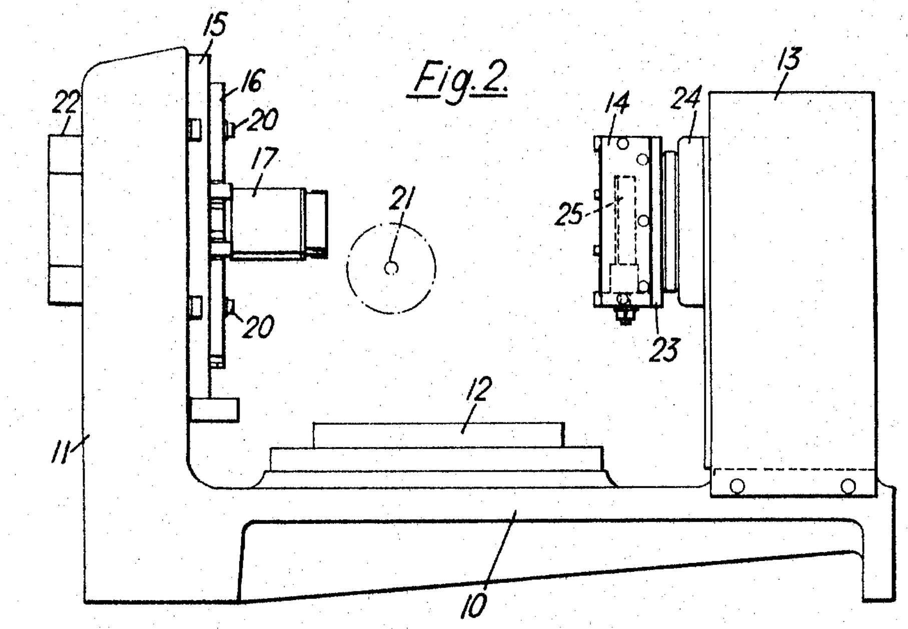
Fig. 4.
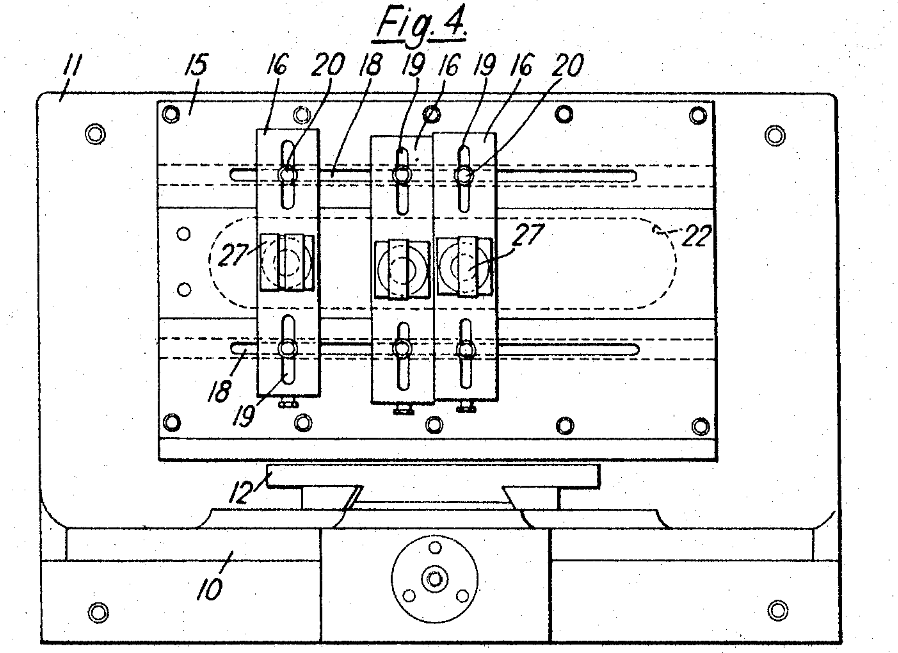
Inventor
WILLIAM GEORGE COLLIS
By Young & Thompson
Attorneys Aug. 26, 1969 W. G. COLLIS 3,463,583

APPARATUS FOR PROJECTING MULTIPLE SUPERPOSED IMAGES

Filed April 25, 1966 10 Sheets-Sheet 4

Inventor
WILLIAM GEORGE COLLIS
By Young & Thompson
Attorneys

Inventor
WILLIAM GEORGE COLLIS
By Young + Thompson
Attorneys

Aug. 26, 1969 W. G. COLLIS 3,463,583

APPARATUS FOR PROJECTING MULTIPLE SUPERPOSED IMAGES

Filed April 25, 1966 10 Sheets-Sheet 6

Inventor
WILLIAM GEORGE COLLIS
By Young & Thompson
Attorneys

Inventor
WILLIAM GEORGE COLLIS
By Young & Thompson
Attorneys

Inventor
WILLIAM GEORGE COLLIS
By Young & Thompson
Attorneys

Inventor
WILLIAM GEORGE COLLIS
By Young & Thompson
Attorneys

APPARATUS FOR PROJECTING MULTIPLE SUPERPOSED IMAGES

Filed April 25, 1966

Inventor
WILLIAM GEORGE COLLIS
By Young + Thompson
Attorneys

United States Patent Office 3,463,583

Patented Aug. 26, 1969

3,463,583

APPARATUS FOR PROJECTING MULTIPLE SUPERPOSED IMAGES

William George Collis, Teddington, England, assignor to Watson Manasty and Company Limited, Harpenden, England, a corporate body of Great Britain Filed Apr. 25, 1966, Ser. No. 545,154
Int. Cl. G03b *21/26, 21/28*
U.S. Cl. 353—37 4 Claims

ABSTRACT OF THE DISCLOSURE

An optical image projector for examination and comparison of industrial products comprises a substantially horizontal support mounting a plurality of adjustable light units. Each light unit comprises a lamp from which a substantially horizontal beam reflected upwards by a first reflector is again reflected by a second reflector in a substantially horizontal direction opposite to the beam from the lamp to the first reflector. The second reflectors are adjustable on upstanding supports. A shutter for cutting off light may be operable by electromagnetic means.

This invention relates to optical image projectors, and aims at the provision of a projector by which there can be examined and compared on a screen, optical images (usually enlarged) of mechanical objects under examination to ensure not less than a prearranged degree of precision in manufacture.

The invention consists in an optical image projector comprising a screen, and a plurality of optical components for throwing on to the screen a plurality of images of different areas of the same article, or the corresponding or different areas of a plurality of different articles.

The various images may be directed to different, adjacent, areas of the screen for comparative observation, or may overlap or be superposed on one another on the screen. The optical units may be adjustable, preferably separately, and provision is preferably made for adjustment in two, or three, mutually perpendicular directions. Means may be provided for selectively screening off all but one or other of the various projected images, to allow them to be examined separately. Colour screens may be provided to allow the various images on the screen to appear in different colours. If desired the optical units may provide different degrees of magnification. One of more sources of light, which are preferably fitted with condenser means, may be provided to illuminate the areas of one or more objects being imaged for examination.

The invention will be clearly understood from the following description of forms (given, however, merely by way of example) which it may assume, and this description will be more readily followed by reference to the accompanying drawings wherein FIGURES 1A–G represent diagrammatically various optical arrangements for different forms of optical projector in accordance with the invention;

FIGURES 2, 3 and 4 represent respectively in side elevation, plan, and front elevation (with lamp housing and attachment removed) of one form of optical projector in accordance with the invention, and by further reference to the additional drawings herewith wherein;

Figures 5, 8, 9, 10, 11, 12:
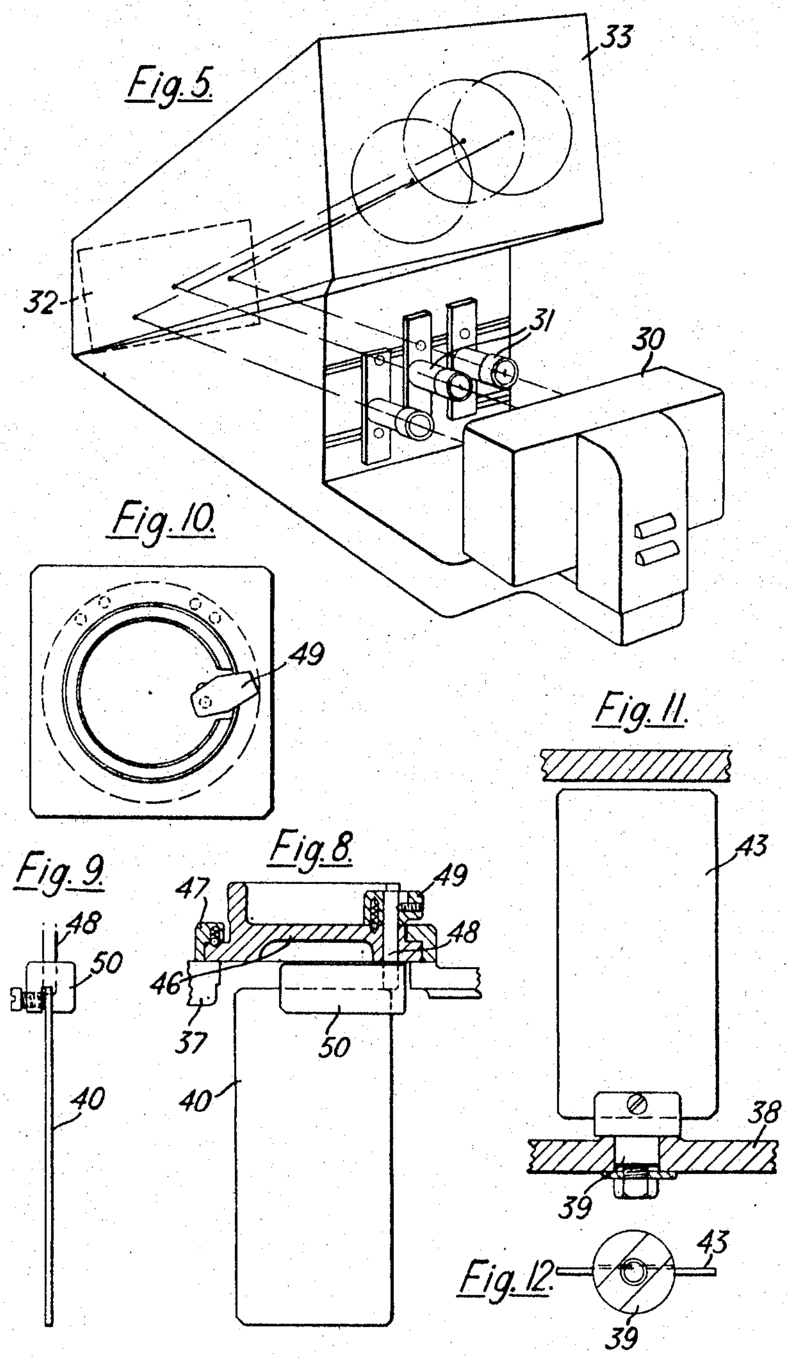
FIGURE 5 represents in perspective an optical image projector in accordance with the invention.
Figures 6, 6A, 16, 17:
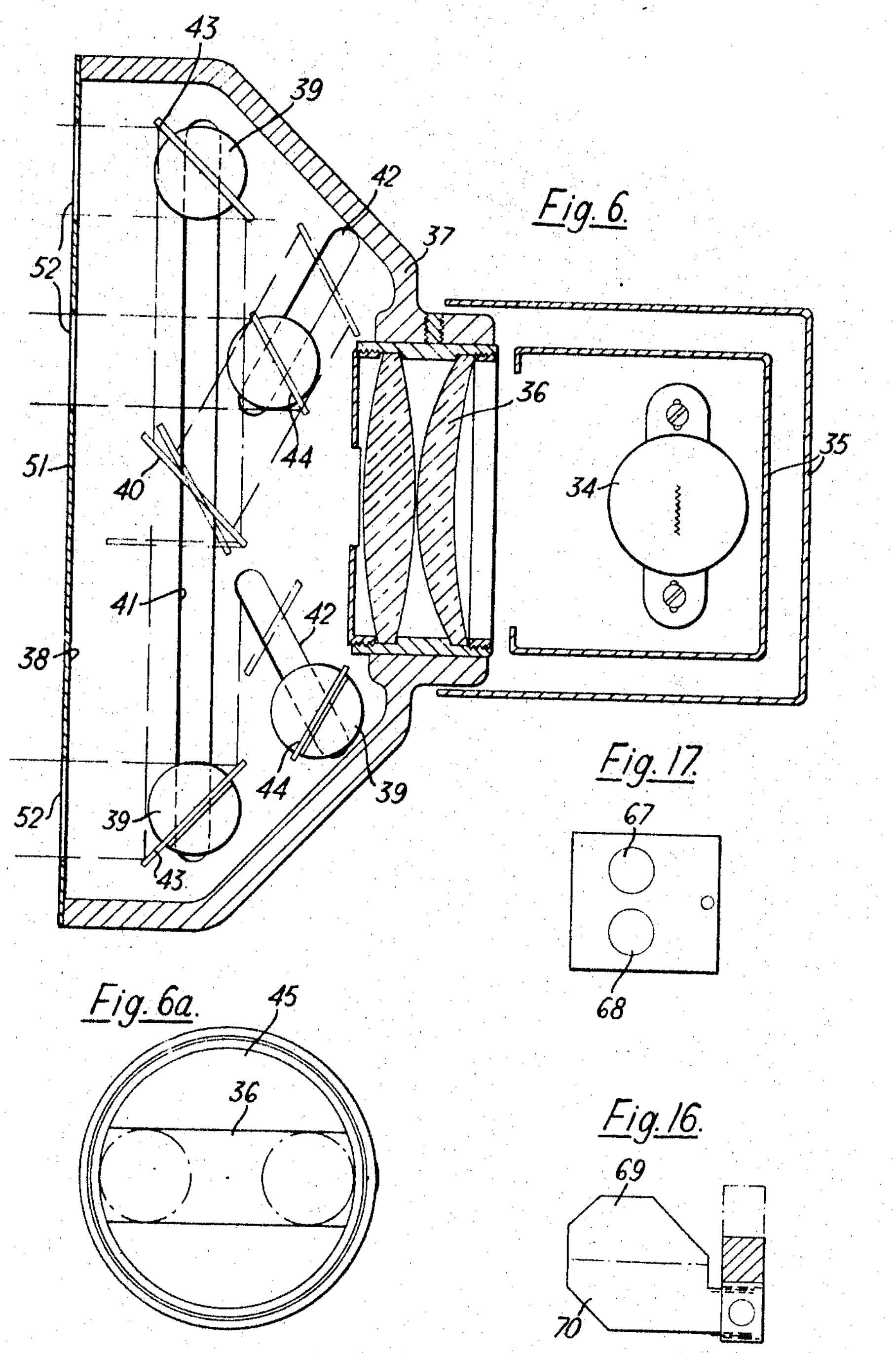
FIGURES 6 and 7 represent respectively in plan section and in sectional side elevation the optical illuminating system of one form of projector such as shown in FIGURE 5.
Figures 7, 18, 19, 20, 21:
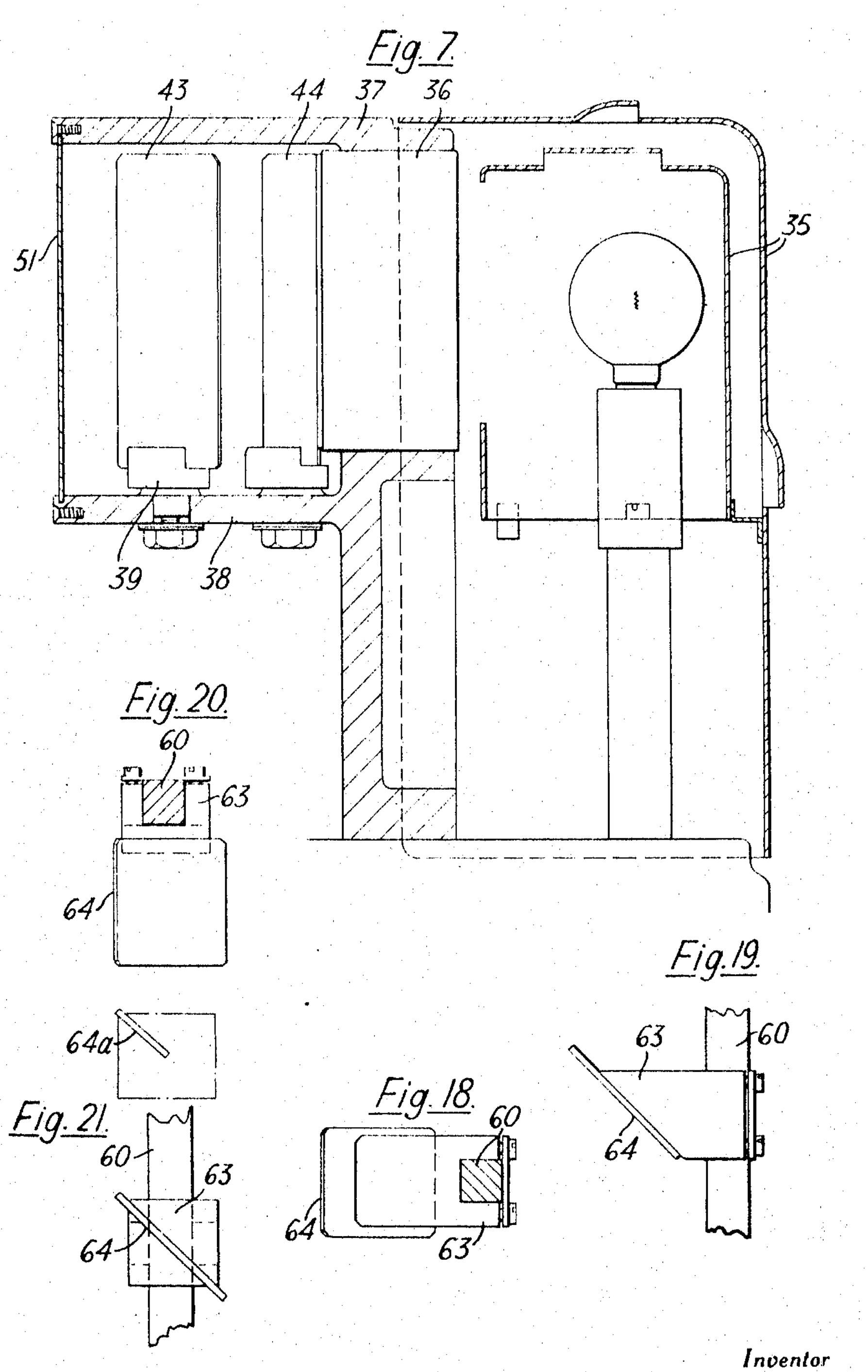
Figure 13:
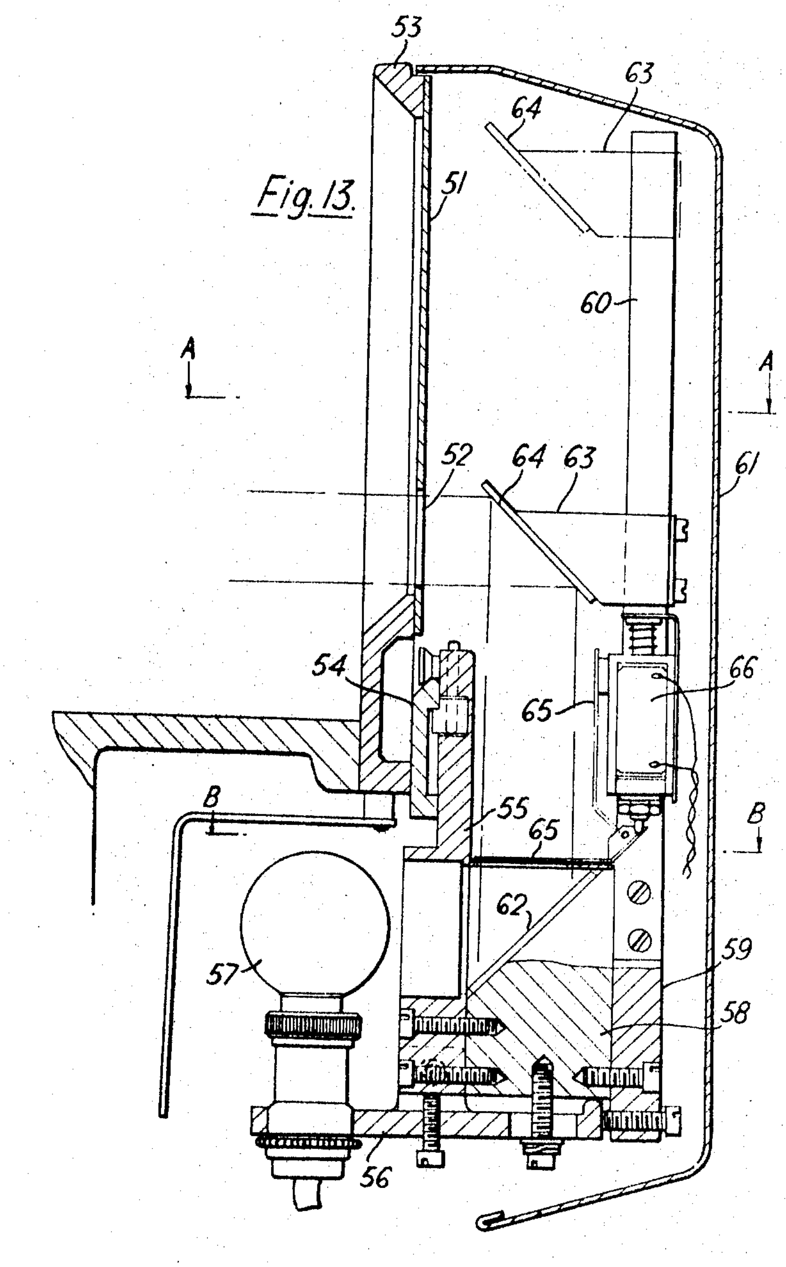
Figures 14, 22, 23:
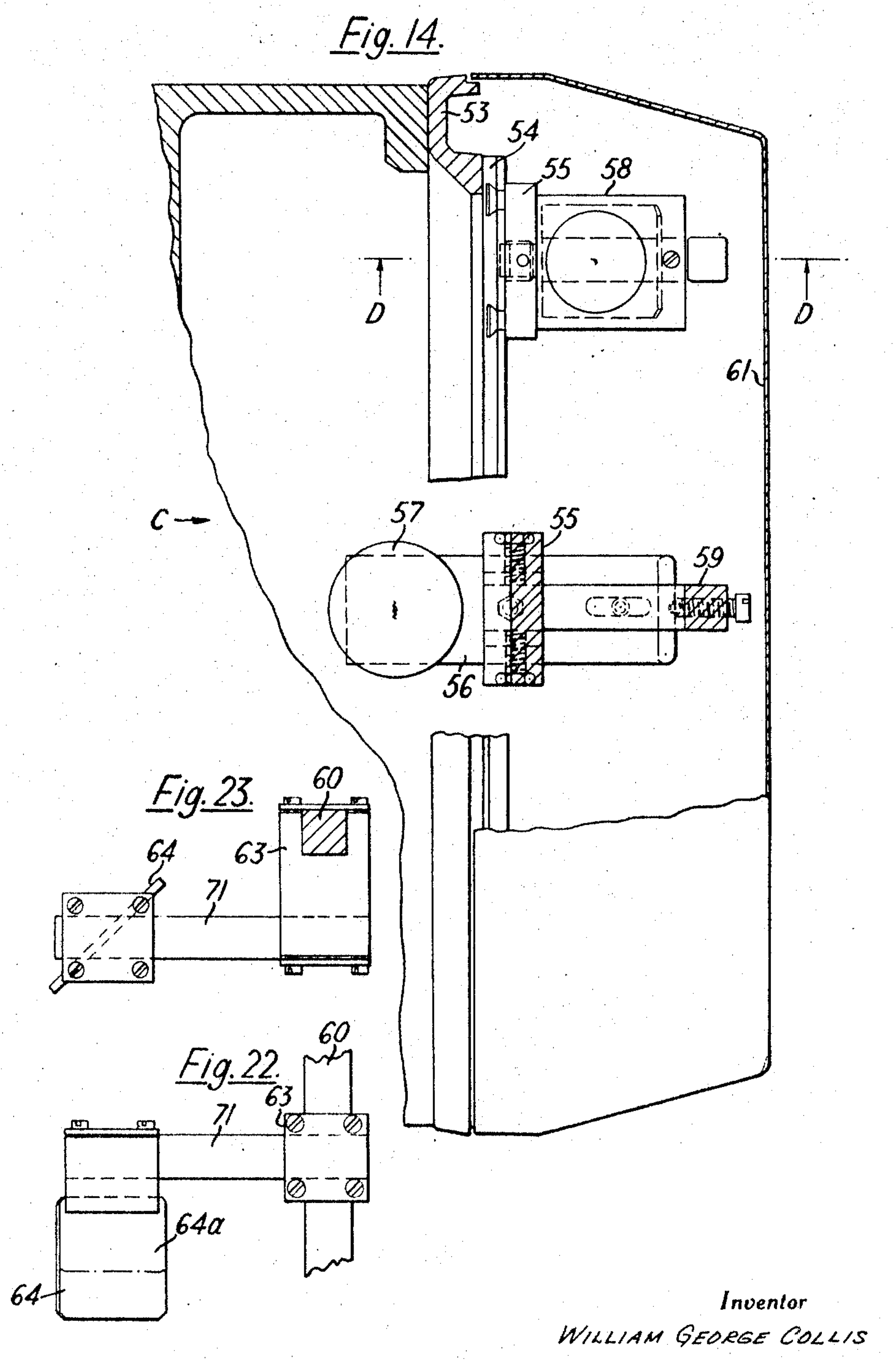
Figure 15:
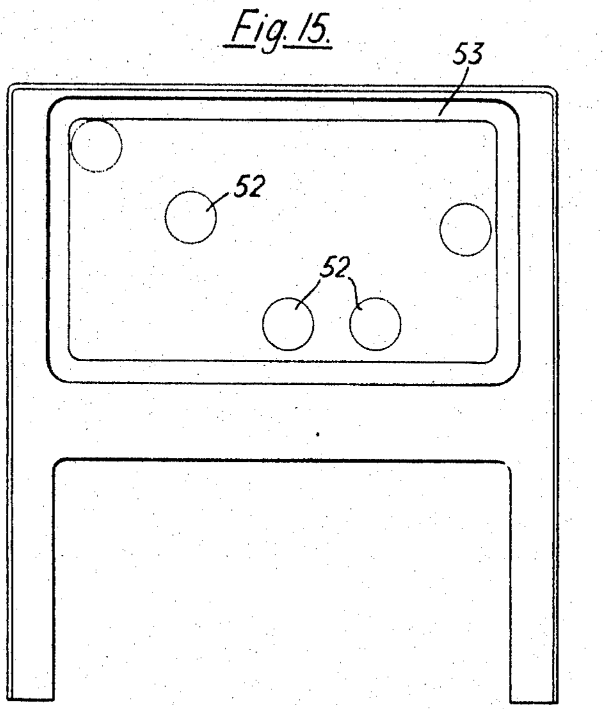

FIGURES 6*a*, and 8–12 represent details of the projector shown in FIGURES 6 and 7;

FIGURE 13 represents a side sectional elevation of another form of image projector in accordance with the invention, along the line D—D of FIGURE 14;

FIGURE 14 represents a sectional plan of the projector shown in FIGURE 13, the upper and lower parts of FIGURE 14 representing respectively sections along the lines A—A and B—B of FIGURE 13;

FIGURE 15 represents in front elevation the projector shown in FIGURE 14 seen in the direction of the arrow C;

FIGURES 16–23 represent details of the projector shown in FIGURES 13–15; and

Figures 24, 25:
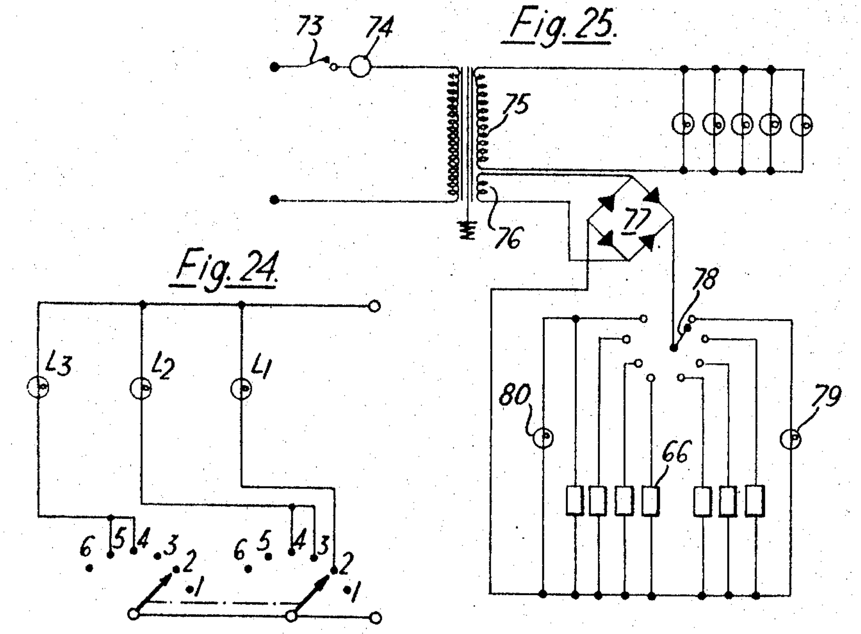

FIGURES 24 and 25 represent forms of control circuit which may be used in an image projector in accordance with the invention.

Figure 1D:
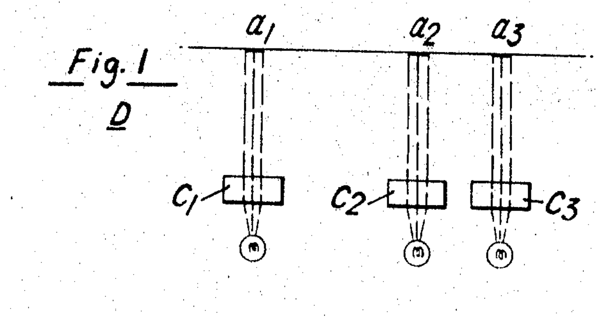

Referring first to FIGURES 1A–G of the aforesaid drawings there are shown diagrammatically various optical arrangements in projectors in accordance with the invention to project on to the screen images $I_1$, $I_2$ and $I_3$ of three areas $a_1$, $a_2$, and $a_3$, which it is desired to examine and/or compare. The areas *a*, *b* and *c* may be different areas of the same object which it is desired to compare (e.g. for accurate relative disposition, size, shape etc.) or may be areas of different objects (e.g. apertures in different plates, or junctions in a printed circuit, which it is desired to examine in order to be sure that they will align when a plurality of plates are packed together). The arrangement shown in FIGURE 1A provides for the images $I_1$, $I_2$ and $I_3$ to be projected by the three lens units to different positions on a common screen, when the areas $a_1$, $a_2$ and $a_3$ are in a common plane. FIGURE 1B shows the arrangement where are areas $a_1$, $a_2$ and $a_3$ are in spaced positions in a common plane and the images are directed to a common position on the screen, where they may be accurately aligned. In these arrangements the optical units have the same magnification. In FIGURE 1c is shown an arrangement where the areas are in different planes, and their images directed to a common screen plane. The optical units are adjusted for focal length to give identical magnifications.

Figure 1E:
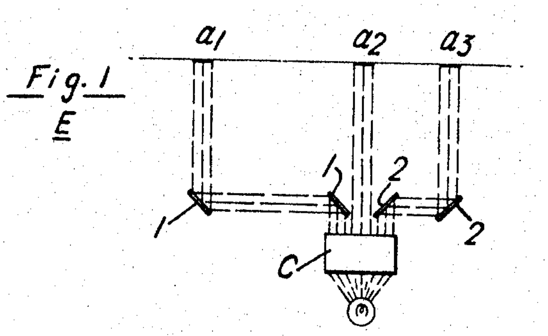
Figure 1F:
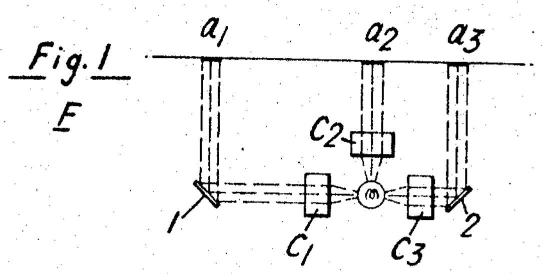
Figure 1G:
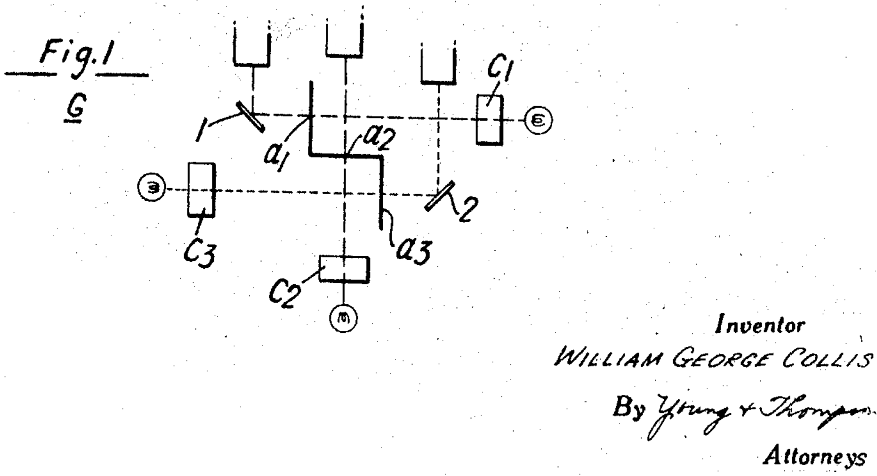

FIGURES 1D–G show digrammatically illuminating means of various forms. In FIGURE 1D three separate condensers $C_1$, $C_2$, $C_3$ each with a light source illuminate the separate areas $a_1$, $a_2$, and $a_3$ under observation. FIGURE 1E shows a single condenser C, with light source, from which light passes directly to one area, e.g. $a_2$, and is also directed by mirrors, prisms or other systems 1, 2 along separate paths to the other areas. FIGURE 1F shows a like arrangement using mirrors, prisms or the like, 1, 2 with three separate condensers operating with a single, common light source. FIGURE 1G represents an arrangement of condensers and mirrors allowing areas in different planes and observable in different directions to be imaged to a common screen plane.

Figure 3:
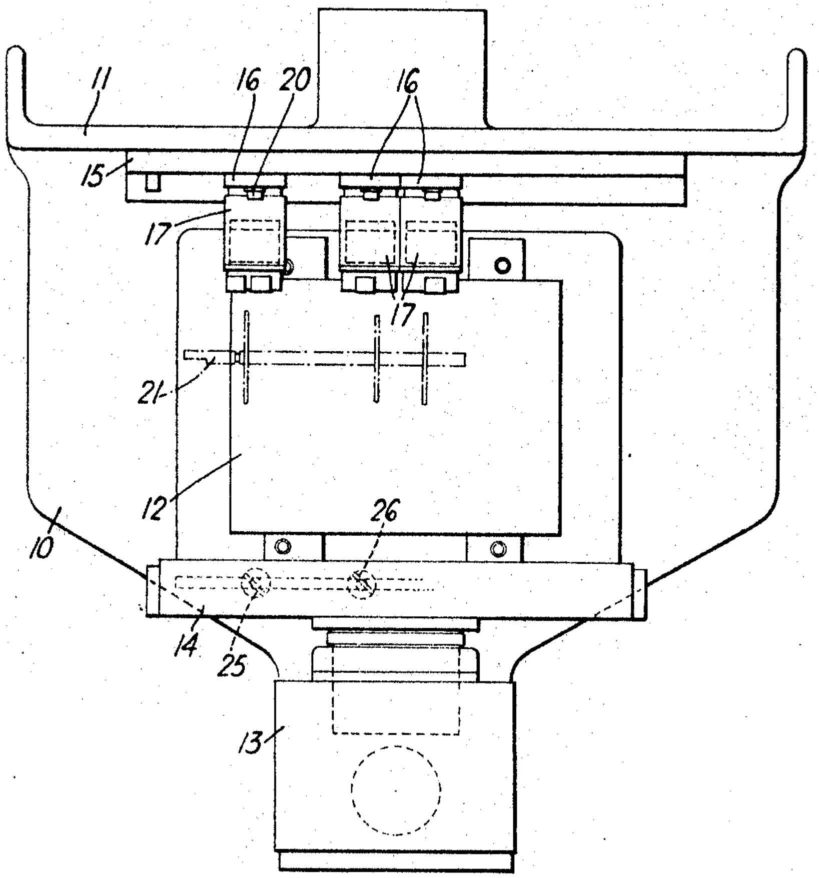

One form of optical projector in accordance with the invention is shown in FIGURES 2–4. A base 10 has a rear upstanding frame 11, and a mounting table 12. On the forward part of the base 10 is removably mounted a lamp housing 13, having attached to the front thereof a condenser casing 14. On the front of the rear frame 11 is detachably secured a plate 15 having adjustably mounted thereon optical units by which images of selected areas of one or more objects are projected on to a screen (not shown) spaced from the rear of the frame 11.

Each optical unit comprises a rigid narrow metal strip 16 apertured at or near to its mid-point to receive a lens assembly 17. The plate 15 has spaced horizontal slits 18, and the strips 16 have slits 19, longitudinally, which stand vertically when the strips are mounted. Screws or bolts 20 pass through the intersections of the slits 18, 19 and are tightened to clamp the strips 16 in desired positions.

By loosening them the strips 16, and their lens assemblies 17, may be separately adjusted, as desired, horizontally in the slits 18, and vertically by the slits 19. An article to be examined (e.g. three discs or wheels on a shaft 21, FIGURE 3) is mounted on the table 12, which can be adjusted on guideways (FIGURE 4) to and away from the lenses.

The plate 15 has a wide slot 22, with semicircular ends, forming an aperture through which the lenses project images. Screening means, e.g. a movable length of opaque fabric in front of this aperture, may be provided, having one or more holes, allowing all but one, or all but a prearranged number of, selected lens (or lenses) to function at once.

The condenser casing 14 may comprise (FIGURE 2 and 3) a housing 23 mounted on the front of a condenser 24 fitted into the lamp housing 13. The housing 23 may incorporate mirror strips 25, 26 rotatable about vertical axes. Some light from the condenser 24 passes directly to an area of the object 21 to be examined and allows one lens assembly to transmit its respective image. Light from the condenser 24 is also directed by the mirrors 25, 26 along another path to another area of the object 21 allowing another lens unit to transmit its image. Other mirrors, similar to 25, 26 are provided to illuminate other areas being observed. The lens apertures may be varied by adjustable screens 27 (FIGURE 4) located in front of the optical units.

When several images of different parts of an object are to be observed at the same time (as in FIGURE 1A) only a specific portion of the screen can be used to receive from each lens the image of a corresponding area of the object, and the apertures of the lenses must be restricted accordingly. It is desirable to use the full aperture of each lens, in order that an image of a larger area of the object can be projected on to the screen, but in this case two adjacent image areas on the screen are liable to overlap unless the spacing of the lenses from which the light is projected is unduly increased, or the magnification reduced, both of which steps are undesirable. When the illuminated areas overlap parts of the two images therein are marred for observational purposes. In order therefore to be able to use such an arrangement means are provided in accordance with the invention for separately viewing such overlapping areas. Such means may comprise mechanical arrangements for selectively stopping, deflecting or shuttering light from the different sources, or transmitted along different paths, (which mechanical means may be actuated manually or mechanically), or means for selectively switching on or off the light sources, e.g. lamps, which may also be activated manually or electrically. When these facilities are actuated electrically the actuating means may be arranged to operate a series of stages automatically in sequence in accordance with a prearranged programme.

A general view in perspective of an optical image projector in accordance with the invention is shown in FIGURE 5. The projector comprises an illuminating system 30 from which beams of light pass through image forming lenses 31 to a rear mirror 32 from which images are reflected to a viewing screen 33, (where it will be noted the illuminated areas may overlap).

One arrangement for selectively illuminating different areas in an instrument such as shown in FIGURE 5 is illustrated in FIGURES 6–12, representing the optical arrangements of one form of illuminating unit 30 (FIGURE 5). A lamp 34 in a suitable casing 35 is fitted behind a condenser 36 mounted in a casing 37 formed with a base 38 provided with slots in which are movably mounted supports such as 39 for mirrors. The condenser 36 projects a parallel beam of light on to a mirror 40 which is located on the axis of the condenser and is rotatable about an axis perpendicular to the condenser axis. The base 38 may comprise a transverse slot 41 beneath the axis of the mirror 40 and opposite side slots 42 inclined in opposite senses to the slot 41, by angles of any value e.g. 30°. Carriers 39 in the slot 41 carry upstanding mirrors 43, one on each side of the central mirror 40. Similarly carriers 39 support mirrors 44, one over each of slots 42. These mirrors are fixed or may be rotatably adjustable on their carriers, and the carriers can be slidably adjusted to desired positions along their slots, and secured there e.g. by clamping nuts. The condenser may be apertured by a slotted screen 45, as seen in front view in FIGURE 6*a*, and the beam of light passing through this aperture falls on the central mirror 40 which can be rotated to direct the beam to any selected one of the mirrors 43, 44, whereafter the beam is reflected towards the appropriate image-forming lenses 31. By appropriate adjustment of the mirror carriers 39 to selected positions in their slots and/or appropriate angular settings of the mirrors on their carriers, (together with necessary complementary adjustment of the lenses 31) the beams directed to the mirror 32 can be located in any desired positions and/or orientations.

The central mirror 40 is preferably mounted for rotation about two parallel axes, and a suitable mounting is shown in FIGURES 8–10. The mirror 40 may be suspended from a holder mounted in the roof of the casing 37. The holder may comprise a flanged disc 46 rotatable in a flanged guide ring 47 fixed to the roof of the casing 37. Through the annular periphery of the disc 46 extends a pin 48 rotatable by a knob 49 secured to its upper end, and riding on the disc 46. The lower end of the pin 48 carries a clip or beading 50 in which is clamped the mirror 40, with its edge in line with the axis of the pin 48. Normally the mirror 40 is located in a diametrical axial plane of the disc 46 so that when the disc 46 is rotated the mirror also rotates about its longitudinal median centre line, and it is such adjustment which directs the beam of light to one or other of the side mirrors 43 or 44 (FIGURE 6). If however it is desired to allow light to pass directly from the condenser 36 to the lenses 31 and mirror 32, the mirror 40 can be rotated about its edge, by throwing over the knob 49, to a position shown in dotted line in FIGURE 6 where it is out of alignment with the light beam. If desired the front of the casing 37 may be closed by a replaceable screen 51 with apertures 52 at selected positions.

Another form of optical image projector in accordance with the invention is illustrated in FIGURES 13–23 of the aforesaid drawings. A lamp house comprises a front apertured plate 53 supporting a masking screen 51, and a bar or rail 54 from which are slidably suspended lamp units. Each lamp unit comprises an apertured front plate 55 apertured to receive a condenser, supporting a base 56 (on which is mounted a lamp 57 in front of the aperture of the front plate) a block 58, and a rear plate 59 from which upstands a square rod 60 (which may be integral with the palte 59). The lamp and its holder are adjustable in each of three mutually perpendicular directions as shown in FIGURES 13–14. The whole is encased in a rear cover plate 61.

The block 58 supports, or is formed as, a reflecting surface 62 inclined at 45° so that light from the lamp is reflected in a vertical direction through an apertured plate supported on the block, and a carrier frame 63 slidably mounted on the rod 60 supports a reflecting surface 64, also inclined at 45°, whereby the vertical light beam from the surface 62 is reflected in a horizontal direction forwards towards the apertured front plate 53, and through an aperture 52 in the screen 51 located in a desired position.

A plurality of lamp units, say three such units, may be mounted on the rail 54 and can be moved to, and locked in, desired positions therein. The carriers 63 may be moved to, and locked at, prearranged positions on their rods 60 and in this way the various beams of light may be located as desired (see FIGURE 15) in relation to the frame 53, and the focusing lenses 31 (FIGURE 5) to which the light beams are directed.

Over the aperture in the top of the block 58 through which light is reflected by the surface 62 may be pivoted a masking plate 65 which closes the aperture, but can be raised about its pivot, to a position, shown in dotted line in FIGURE 13, where it leaves the aperture open. A relay 66 attached to the rod 60 beside the plate 65 may engage a rearwardly projecting limb of the masking plate 65 so that by electrically operating the relay 66 the masking plate may be opened or closed in relation to the aperture.

In some cases it may be desired for a single lamp 57 to provide two light beams and in this case the plate on the top of the block 58 may comprise two spaced apertures 67, 68 (FIGURE 17) covered by flaps 69, 70 (FIGURE 16) forming half-shutters, separately operable by independent solenoid relays.

Various forms of beam-reflecting mirrors which may be incorporated in the lamp housing described above are shown in FIGURES 18–23. FIGURES 18 and 19 represent in side and rear views the arrangement shown in FIGURE 13. In the form shown in FIGURES 20 and 21 the carrier 63 projects to one side of the rod 60 instead of in front of it, and may support a full mirror 64 (FIGURE 21), or a half-mirror 64*a*. The form shown in FIGURES 22 and 23 incorporates an extension arm 71 projecting from the carrier 63, to support on its outer end a full mirror 64, or a half-mirror 64*a*. The masking flaps 65 associated with the various lamps as described above are operated in order selectively to bring into use one or more of the various light beams available.

Alternatively, or in addition, in apparatus in accordance with the invention, the light beams may be selectively controlled by switch means in the lamp circuits. Examples of such control arrangements are shown in FIGURES 24 and 25. In FIGURE 24 three lamps L1, L2 and L3 are connected in parallel to a source of electricity through a double rotary switch, having pairs of contacts Nos. 1–6 over which a wiper arm 72 can be moved. On contact 1 the arm leaves the circuit switched off: on 2 lamp L1 is alight: on 3 lamp L2 is illuminated: on 4 both lamps L2 and L3 function: on 5 only lamp L3 is alight: and 6 is a spare contact for further connection as desired.

The more complicated circuit shown in FIGURE 25 controls the solenoid relays such as 66 (FIGURE 13), and comprises an on-off switch 73 and signal lamp 74 leading to a transformer, having a 250 watt secondary winding 75 feeding the lamps (here shown as five lamps in parallel), and another 10 watt, 8.5 volt secondary winding 76 connected by a rectifier 77 to a rotary switch 78. The contacts of this switch are connected to D.C. solenoid relays (corresponding to relay 66), and the outer contacts connected respectively to a green signal lamp 79 and a red signal lamp 80.

It should be understood that the invention is not limited solely to the details of the forms described above, which may be modified, in order to meet various conditions and requirements encountered, without departing from the scope of the invention.

What I claim is:

1. An optical image projector comprising a screen, and means for projecting on to said screen a plurality of images for simultaneous observation, said image-projecting means including a support, a plurality of light units mounted on said support, each of said light units comprising a lamp, a first reflecting surface located to receive a beam of light travelling along a substantially horizontal path from said lamp, and to reflect said beam in a substantially vertical upward direction, an upstanding support, a second reflecting surface mounted on and adjustable on said upstanding support, said second reflecting surface being adapted to reflect the said upwardly directed beam of light received from said first reflecting surface, along a substantially horizontal path in a direction opposite to that of the beam travelling from said lamp to said first reflecting surface, each light unit comprising a shutter for selective cutting off of light transmission when desired.

2. A projector according to claim 1, and electromagnetic means for opening and closing said shutter.

3. An optical image projector comprising a screen, and means for projecting on to said screen a plurality of images for simultaneous observation, said image-projecting means including a support, a plurality of light units mounted on said support, each of said light units comprising a lamp, a first reflecting surface located to receive a beam of light travelling along a substantially horizontal path from said lamp, and to reflect said beam in a substantially vertical upward direction, an upstanding support, a second reflecting surface mounted on and adjustable on said upstanding support, said second reflecting surface being adapted to reflect the said upwardly directed beam of light received from said first reflecting surface, along a substantially horizontal path in a direction opposite to that of the beam travelling from said lamp to said first reflecting surface, and an apertured masking screen in the path of the beams reflected from said second reflecting surfaces.

4. An optical image projector comprising a screen, and a plurality of optical components for throwing onto the screen a plurality of images for simultaneous observation, said image projecting means comprising a plurality of reflector means whereby separate light beams can be directed at the same time along different paths toward the image forming components, an enclosure formed with a rail extending transversely of the direction in which light is to be directed toward the image forming components, and a plurality of light units supported on and adjustable along said rail, each light unit comprising a lamp, a first reflecting surface located to project a horizontal beam of light received from the lamp in an upward vertical direction, an upstanding rod, a second reflecting surface mounted on said rod and adjustable therealong and reflecting the beam received from the first reflecting surface along a substantially horizontal path in a direction opposite to that of the beam from the lamp toward the first reflecting surface.

References Cited

UNITED STATES PATENTS

| | | |
|---|---|---|
| 1,857,135 | 5/1932 | Brenkert et al. |
| 2,747,456 | 5/1956 | Waller et al. |
| 2,802,393 | 8/1957 | Young. |
| 3,036,496 | 5/1962 | Frederick et al. |

FOREIGN PATENTS

| | | |
|---|---|---|
| 857,365 | 4/1940 | France. |
| 348,090 | 10/1929 | Great Britain. |

NORTON ANSHER, Primary Examiner

ROBERT P. GREINER, Assistant Examiner

U.S. Cl. X.R.

353—89